(12) United States Patent
Eljuse

(10) Patent No.: US 9,244,821 B2
(45) Date of Patent: Jan. 26, 2016

(54) LATENT DEFECT INDICATION

(71) Applicant: Accenture Global Services Limited, Dublin (IE)

(72) Inventor: Basil Eljuse, Cambridge (GB)

(73) Assignee: Accenture Global Services Limited, Dublin (IE)

( * ) Notice: Subject to any disclaimer, the term of this patent is extended or adjusted under 35 U.S.C. 154(b) by 167 days.

(21) Appl. No.: 14/039,020

(22) Filed: Sep. 27, 2013

(65) Prior Publication Data

US 2014/0095937 A1 Apr. 3, 2014

(30) Foreign Application Priority Data

Sep. 28, 2012 (EP) .................................. 12186705

(51) Int. Cl.
*G06F 11/00* (2006.01)
*G06F 11/36* (2006.01)

(52) U.S. Cl.
CPC ........ *G06F 11/3688* (2013.01); *G06F 11/3604* (2013.01); *G06F 11/3684* (2013.01)

(58) Field of Classification Search
CPC ............ G06F 11/3604; G06F 11/3684; G06F 11/3688
See application file for complete search history.

(56) References Cited

U.S. PATENT DOCUMENTS

| 7,293,213 | B1 * | 11/2007 | Xiao | G06F 11/3688 714/741 |
| 7,614,043 | B2 * | 11/2009 | Ognev et al. | 717/126 |
| 2005/0262399 | A1 * | 11/2005 | Brown et al. | 714/38 |
| 2006/0156286 | A1 | 7/2006 | Morgan et al. | |
| 2007/0074149 | A1 * | 3/2007 | Ognev et al. | 717/101 |
| 2011/0302552 | A1 | 12/2011 | Wada | |
| 2012/0221519 | A1 * | 8/2012 | Papadomanolakis | G06F 11/3688 707/615 |
| 2013/0151906 | A1 * | 6/2013 | D'Alterio et al. | 714/38.1 |
| 2014/0033174 | A1 * | 1/2014 | Farchi et al. | 717/124 |
| 2014/0310670 | A1 * | 10/2014 | Oberai | 716/112 |
| 2015/0082277 | A1 * | 3/2015 | Champlin-Scharff et al. | 717/120 |

FOREIGN PATENT DOCUMENTS

WO WO 2009/095741 8/2009

OTHER PUBLICATIONS

European Search Report issued by the European Patent Office in corresponding European Patent Application No. EP 12186705.5-1225, dated Dec. 14, 2012.
http://software.intel.com/en-us/articles/intel-trace-analyzer/ (8 pages).
http://nptltracetool.sourceforge.net/ (2 pages).

* cited by examiner

*Primary Examiner* — Joshua P Lottich
(74) *Attorney, Agent, or Firm* — Harrity & Harrity, LLP

(57) ABSTRACT

A method of determining test data for use in testing a software. The method includes determining that at least part of a software structure of the software to be tested is similar to, or the same as, a software structure associated with a defect. The method also includes retrieving information regarding operational circumstances for causing the defect in the software associated with the defect. The method further includes creating, based upon the retrieved information, test data for testing the software to be tested.

20 Claims, 6 Drawing Sheets

LATENT DEFECT INDICATION

CROSS-REFERENCE TO RELATED APPLICATION

This application is based on and claims the benefit of priority from European Patent Application No. 12186705.5 filed on Sep. 28, 2012, the entire contents of which are incorporated herein by reference.

TECHNICAL FIELD

This disclosure relates to the identification of latent defects. In particular, but without limitation, this disclosure relates to the identification of latent defects in computer systems comprising a plurality of components arranged to pass data therebetween.

BACKGROUND

Live or operational computer systems generally have latent defects—also called bugs. Defects may result in unexpected and/or undesirable computer performance and can cause program and/or system crashes.

In terms of the impact to end system users and the effort needed to identify, isolate, fix, and/or re-release in corrected form, software having defects, the more complex and costly defects are often those involving the interaction of multiple components or, in the case of large systems, the interactions of multiple subsystems.

SUMMARY

The invention is set out in the claims.

In one example, a computer implemented method and apparatus including a processor for carrying out the method are described. The method is for deriving test data to use on new software (software to be tested) in order to discover latent defects, or bugs, in the software. A determination is made that a software structure of the new software corresponds to a software structure known to be associated with a defect. A software structure may relate to the structural element of only a part of the relevant software and, although it may include one or more "Structs" as employed in, for example, the C programming language, may also not include any such "Structs". Information regarding operational circumstances associated with the defect is retrieved and that information is then used to create test data for testing the new software—for example by setting the test data to include the retrieved information, When determining that a software structure of the new software corresponds to a software structure associated with a defect, a similarity measure between a profile data set representing the software structure of the new software and a profile data set representing the software structure associated with a defect is calculated and, in the event that the similarity measure meets a predetermined criteria, then the software structure of the new software is determined to correspond sufficiently to that associated with the defect.

The profile data set representing the software structure of the software to be tested may be derived from the new software and the profile data set representing the software structure associated with the defect may be retrieved from a defect store that maintains a database of a plurality of software structures associated with respective defects.

Once the test data has been created, it may then be used to test the new software and, in the event that use of the test data provokes a defect in the new software, then one or both of a profile data set representing the structure of the new software and information regarding the operational circumstances that resulted in that defect may be saved to one or more databases.

The methods described herein may be carried by a non-transitory computer readable medium carrying computer readable instructions arranged, upon execution by a processor, to carry out those methods.

In one example, a method of determining test data for use in testing software involves identifying software that is known to have one or more bugs and which has a similar structure to software under test before using knowledge of those one or more bugs to create test data for the software under test.

BRIEF DESCRIPTION OF THE DRAWINGS

Examples of the present disclosure will now be explained with reference to the accompanying drawings in which.

DETAILED DESCRIPTION

Figure 1:
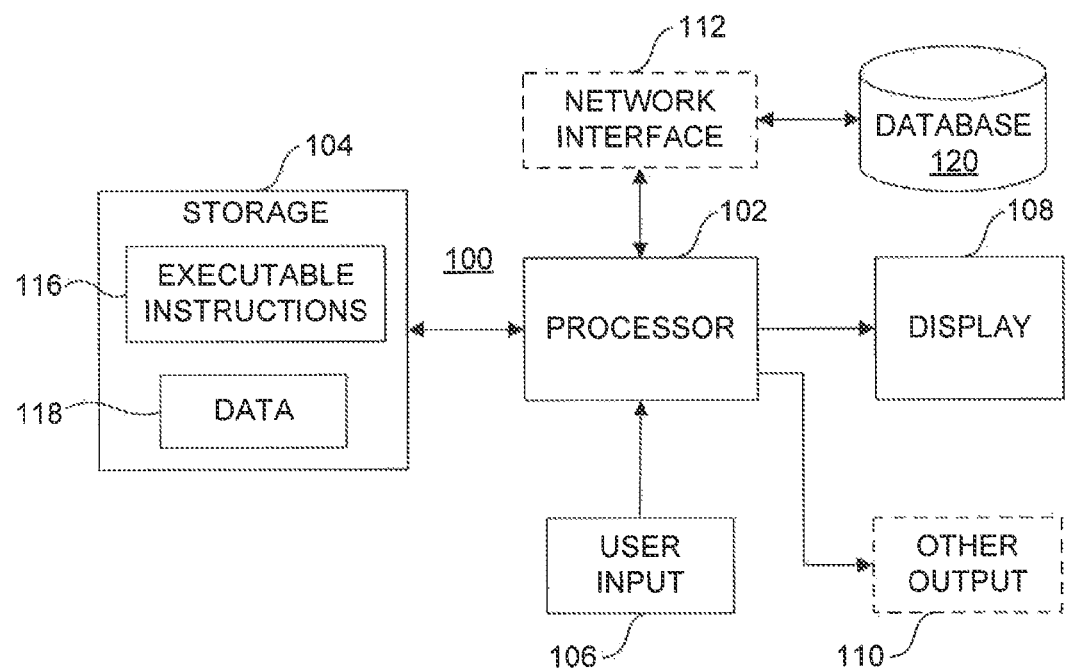
FIG. 1 shows a block diagram of an apparatus that may be used to implement the present disclosure.

Referring now to FIG. 1, an apparatus suitable for implementing at least part of the present disclosure is illustrated. In particular, the apparatus 100, which may comprise a general purpose computer or similar processing platform, comprises a processor 102 in communication with a storage device 104, a user input 106, a display 108, other output mechanisms 110 and a network interface 112. The processor 102, which may comprise a microprocessor, microcontroller, digital signal processor, similar devices or combinations thereof, preferably operates under the control executable instructions 116 stored in the storage device 104. Similarly, during operation, the processor 102 operates upon stored data 118, also included in the storage device 104, as well as other input data that may be provided via the user input 106 or the network interface 112—for example from database 120. Further still, based on the operations undertaken by the processor 102, data may be output via the display 108 or the other output mechanism 110 as commonly known to a skilled person. The storage device 104 may comprise one or more memory devices including, but not limited to, random access memory (RAM), read only memory (ROM), removable magnetic or optical storage media, hard drives, etc.

The user input 106 allows a user to interact with the apparatus 100 and, in particular, to control processing implemented by the processor 102 via one or more user inputs. In particular, the user input 106 may comprise a user selection device such as a mouse, touch screen, touch pad or similar such devices as known to those having ordinary skill in the art. The display 108 may comprise any display device typically used with a computer, either integral or external, such as a flat-panel display, cathode ray tube or other type of monitor. The other output mechanisms 112 may include lights, enunciators, speakers, or other components commonly found in computers that provide information to users thereof. The network interface 112, allows the device 100 to be coupled to public or private communication network, such as the World Wide Web or proprietary networks such as enterprise local area or wide area networks, respectfully.

As part of pre-release defect removal and quality assurance processes that are carried out by program and system developers, by the time of release of a computer program or system, a substantial amount of defect information relating to that program or system will generally have been discovered. The defect information will often include information relating to defects that may be, or may have been, associated with the interaction of different components or subsystems.

The Pareto principle—which explains that, for many events, roughly 80% of the effects come from 20% of the causes—applies to software defects in complex systems involving the interaction of different components or subsystems. Systems and methods consistent with the present disclosure may apply that insight by capturing information regarding defects that have previously been identified for other complex systems and employing that information to improve defect identification efficiency.

Defect Identification

During projects involving the creation of new or modified systems, tests may be run to attempt to identify defects so that the defects can be removed. The tests may be in the form of routine tests that can be run for all systems, or may be system specific. As one example, a designer or tester of a system may have intuition as to possible issues that may arise and so the tests may look to provoke those issues.

One way of testing systems is to provide them with test data as a starting point for system execution. A system executing test data may be monitored to see whether it produces an expected result or whether it produces another result or crashes, hangs, causes buffer overflow, or the like. Although test data may relate to initial data for a system to execute, for example a set of values to pass to an executable program when it is called for execution, it may also relate to intermediate data for a program to process once the program has already been called—for example a data structure having predetermined values to be passed to a function in a system including a procedural programming language component, or a data object in a system including an object oriented component. Accordingly, test data may comprise intermediate information—such as the values of certain variables or objects that may enable an intermediate element of a system to be tested without the need to execute an entire program in order to arrive at the position to be tested.

In the event that testing results in a defect being identified, the fact that a defect has been identified and/or information relating to the operational circumstances under which the defect occurred can be captured, for example by creating an entry in a defect store or database. An example defect store comprises a database of software structures associated with respective defects; the database may be arranged not only so that its data may be accessed, but also so that new data regarding one or more software structures and associated defect(s) may be added to the database. Information relating to the operational circumstances under which the defect occurred may comprise the test case, or usecase data that caused the defect to occur—such as the specifics of interactions between two or more components. Additionally, or alternatively, it may comprise intermediate information—such as the values of certain variables, the existence and possible contents of certain objects, the amount of free RAM available at the point that the defect occurred, etc. Operational circumstance data need not be limited to data recorded at the time of defect occurrence and may include information relating to the operational circumstances that preceded the defect, for example, if a number of procedural steps preceded defect occurrence, each of those procedural steps, and possibly also variable values, objects, etc., associated with each of those steps may be included in the operational circumstances data.

In addition to capturing information relating to the operational circumstances surrounding defect occurrence, profile data regarding the system for which the defect occurred is determined and associated with the operational. circumstances information—for example by creating a database entry that is associated with or linked to a corresponding operational circumstances information entry.

System Profiling

Figure 2:
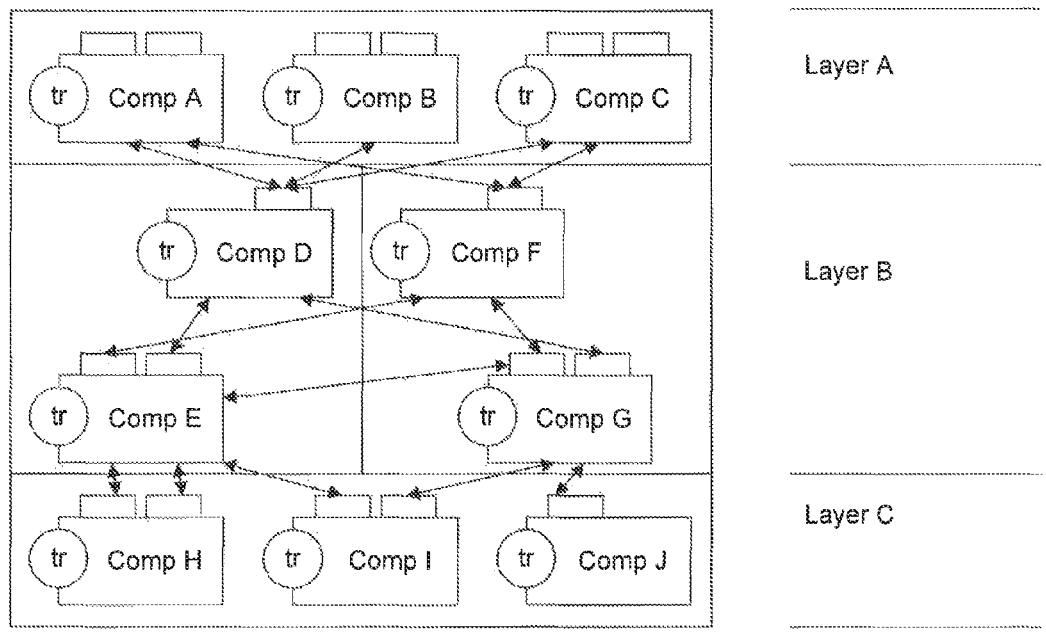
FIG. 2 shows an example architectural profile of a system including system components and their interrelations.
Figure 2:
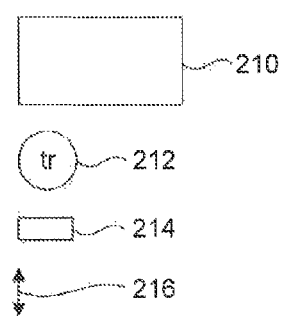

In order that captured information regarding a given defect and the operational circumstances under which it occurred may be employed for analysing systems other than the system upon which that defect occurred, profile data regarding the setup of the system upon which the defect occurred is determined and associated with that defect's entry in the defect store. Profile data may include architectural dependencies, indications of the particular components of a system, and/or the interrelation between those components and an example system setup is illustrated in FIG. 2 which shows an example architectural profile of a system including system components and their interrelations. In the top part of FIG. 2, a layered architectural structure is shown in which a plurality of components (labelled Comp A to Comp J) are shown in three layers (labelled layer A, layer B, and layer C). The bottom part of FIG. 2 provides a key for the top part of FIG. 2 with: reference numeral 210 representing an individual system component within a layer; reference numeral 212 representing a trace-point (or hook) enabled on a component to allow profiling of the runtime interactions between various components in the system; reference numeral 214 representing an interface of a component by which it to interacts with other components in the system; and reference numeral 216 representing a possible runtime link between components through the interfaces.

Although the interface points of FIG. 2 are not per se labeled in the top part of the figure, in the event that a component has two interface points, the leftmost one may be referred to as interface point 1 (IF 1) and the rightmost one as interface point 2 (IF 2); in the event that a component has only one interface point, that interface point may be referred to as interface point 1 (IF 1). Such labels are for the explanatory purposes only and a skilled person would recognise that a component may have different numbers of interface points and that they may be differently labeled.

Example layers for the system of FIG. 2 include layer A corresponding to a core layer, layer B corresponding to a loader layer and layer C corresponding to a component layer.

A person skilled in the art would recognise that, although the above has been described with reference to systems having layered architectures, the approaches described herein could equally be applied, to systems not having layered structures.

Example components in a system include: objects in an object orientated programming environment; functions in a procedural programming environment; interacting computer programs such as an operating system and programs being run on that operating system; and different system elements, for example Java apps, in a layered architecture such as the Android operating system.

As a further example, complex software may be structured as a 'multi-tier' architecture which may have 'n' tiers of system components for delivering specific capabilities. Top tier components may expose, or act as an interface for, services needed for User Interface (UI) components which are employed by a user or actor exercising the system. Middleware, or middle tier components, simplify and/or abstract various functionalities needed by top tier components, and lower tier components abstract hardware components. A banking application is one example of a multi-tier software system. The top tier of which may be front end software systems such as: account management applications, electronic ledgers, ATM front-end applications, etc. The middle tier components may provide authentication or security services needed by the banking application and the lower tier components may include a database layer arranged to interact with databases that hold relevant data.

Further, in embedded systems, for example in smart TVs, multiple system components may deliver specific capabilities by way of UI components arranged to: provide menu options; show an the EPG (electronic programme guide); allow a user to set reminders for recording; etc. There may be a core component arranged to interface with key TV functionality—for example: to decode AV signals and render them onto a TV screen; or to provide complex functionality like PiP (Picture in Picture) in which multiple AV streams are decoded together and rendered on multiple 'windows' on the screen. Low level components may interact with an HDMI interface (High Definition Multimedia Interface) arranged to deliver signals into the TV for rendering. There also may be specialized components arranged, for example to deliver Digital Living Network Alliance (DL-NA) connectivity for discovering content over a network and rendering that on to the TV. As one possibility UPnP (Universal Plug n Play) architecture which enables content discovery and rendering for the smart TV may be implemented by the system.

Example profile information may include a list of the component parts of a system, lists of with which other component parts each component part interacts, and more complicated system information, A number of system profiling tools are commercially available and these include: Rational Raphsody provided by IBM of New York, USA; Imagix 4D provided by Imagix of San Luis Obispo, Calif., USA; UML modelling languages; Intel's trace analyser (http://software-.intel.com/en-us/articles/intel-trace-analvzer/) which allows users to enable traces and understand run time execution sequences for MPI (Message Passing Interface) systems; and the Native POSIX Thread Library (NPTL http://nptltrac-etool.soureeforge.nett) which is an open source software project for enabling tracing capability in Linux software to allow the definition and enablement of tracepoints for observation of the output of runtime behavior of components when a system is executed. A person skilled in the art would understand that any profiling tool that produced profile data regarding the setup of a system could be employed for the purposes of implementing the techniques described herein. Profiling tools suitable for employment with the approaches described herein may be arranged to profile systems so as to identify system bottlenecks with respect to performance when a particular individual, or type(s) of usecase(s) are executed. As another possibility, profiling tools suitable for employment with the approaches described herein may be arranged to profile systems during a debugging procedure to help isolate and identify the root causes of failures. Preferably the profiling tool provides an indication of the interaction of various components over time and/or the sequence of those interactions when a particular test case is executed.

Although the whole of a system may be profiled in order to provide profile data, as another possibility, only a part of the system would be profiled.

Figure 4:
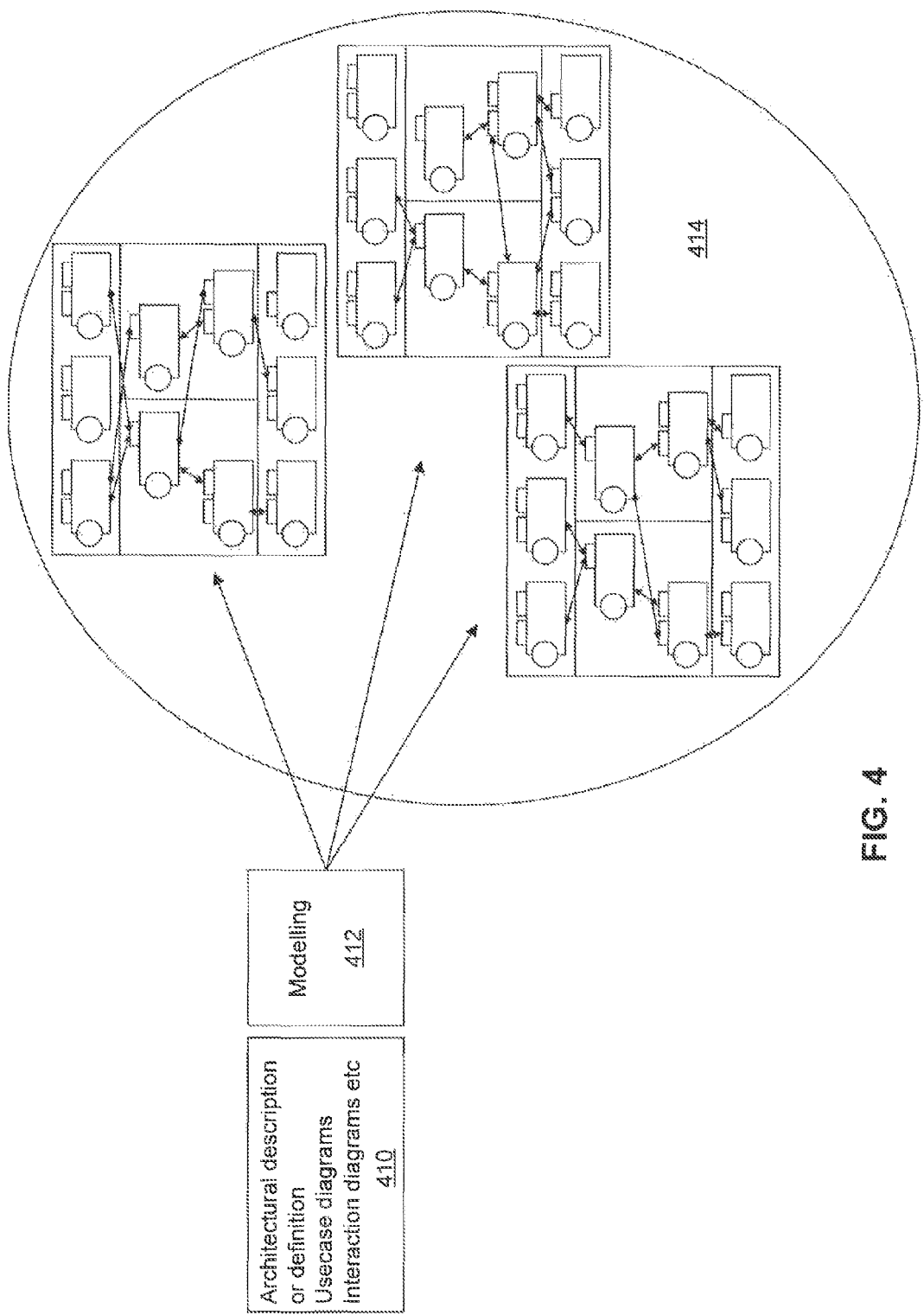
FIG. 4 illustrates an approach for profiling systems.

FIG. 4 illustrates a possible approach for profiling systems. At point 410, an architectural description or definition of a system, usecase information or diagrams (representing steps defining interactions between a role (or actor) and a system, to achieve a goal), and/or interaction information or diagrams are provided to a modeling stage 412 which interprets its input to create profile data. The profile data may comprise structural information. As one possibility, the profile data contains information about different interactions that may occur between different components of a system—represented graphically at 414.

When modeling a system to create profile data containing information about different interactions that may occur between different components of a system, the created profile data may be a model of the whole of the system so that 'all possible' interactions of the system's various components are captured by the modeling process. When a system is known to have a defect, the profile data may not include 'all possible' interactions of the system's various components and may instead relate only to the subset of interactions that bring about the defect. When creating profile data for a system known to have a defect, it may be that the entire system is modeled before a subset of interactions is extracted from an entire system model.

In addition to storing created profile data, data concerning the modeling of all or part of the system from which that profile data was created may be stored, for example in the database 120.

Example of Operational Circumstances for a Profiled System

Figure 3:
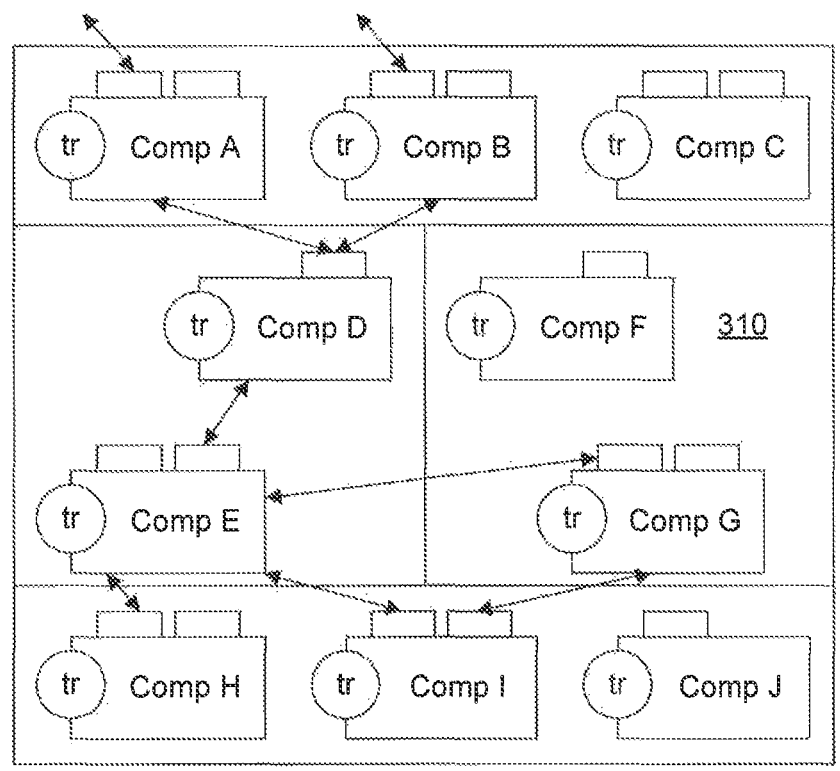
FIG. 3 graphically depicts the operational circumstances relating to a usecase.

An example usecase or set of operational circumstances relating to a specific system is shown in FIG. 3. The key shown in FIG. 2 and explained above applies equally to system of FIG. 3 which depicts an example set of component interactions which could be expected to be observed when a particular usecase or test case is executed and profiling is tuned ON, or tracepoints are enabled, for the system of FIG. 3. In the example of FIG. 3, the following tracing output from the various tracepoints 'tr' of system 310 occur:

at time point 1, an event occurs at interface 1 of component A,
at time point 2, an event occurs at interface 1 of component B,
at time point 3, an event occurs at interface 1 of component D,
at time point 4, an event occurs at interface 2 of component E,
at time point 5, an event occurs at interface 1 of component D,
at time point 6, an event occurs at interface 1 of component H,
at time point 7, an event occurs at interface 1 of component I,
at time point 8, an event occurs at interface 1 of component G, and
at time point 9, an event occurs at interface 2 of component I.

In the event that the above operational circumstances uncover a defect in component E, then information that a defect occurred at component E is entered into the defect store along with associated operational circumstance information, which could be of the form:

T1->CompA.IF 1
T2->CompB.IF 1
T3->CompD.IF 1
T4->CompE.IF 2
T6->CompH.IF 1

T7->CompI.IF 1
T8->CompG.IF 1
T9->CompI.IF 2

Identification of Systems Having Similar Profiles

When a new system is to be processed for identification of latent defects, the new system is profiled. The new system's profile data is then used to search a defect store to identify, stored profile data that is either the same as, or similar to, the profile data of the new system. A similarity measure may be employed when comparing the new system's profile data with stored profile data in order to determine (for example with reference to a predetermined threshold) whether the two data correspond sufficiently to warrant simulating the operational circumstances that brought about the defect that caused the stored profile data to be saved in the defect store. A very simple example similarity measure would have a value of I in the event that both profiles contained the same components (and/or interconnections) and a value of 0 otherwise. As another possibility, a value may be given to each component (and/or interconnections) in common and the total value employed as a measure of similarity. A person skilled in the art would recognise that a large number of known similarity measures could be applied in order to determine whether or not two profiles corresponded and/or the amount of similarity between two profiles. For example, for each profile data, components and/or their interrelations could be represented. pictorially or in an n—degree array and an image processing similarity measure applied to thereto; example similarity measures include cross correlation, sum of squared differences, structural similarity, mutual information, etc.

As one possibility, the interaction of various system components at their respective interfaces may be represented using a graph in which different component interactions are associated with different nodes of the graph. Comparisons of the routes by which the graphs are traversed and/or of the nodes of the graph may then be used to asses the similarity of two different profiles. In such circumstances, a similarity measure may be evaluated between two graphs for example by calculating a cross correlation measure between the nodes of a pair of graphs each representing a different profile.

Advantageously, the use of non-binary similarity measures enables the determination of test cases for systems that may be quite different from those used to populate the data store. This can be particularly useful when a new and significantly different system needs to be first tested. As one possibility, the approaches described herein may be employed to identify test cases from one platform for testing on a different other platform.

Determining Test Cases

Once a stored profile data entry has been identified as having a similar profile to a new system to be tested, information regarding the operational circumstances for causing the defect known to be associated with the stored profile data is retrieved from the defect store and test data for testing the new system is created based upon the retrieved information.

Test data may be created so as to be exactly the same as the information regarding the operational circumstances for causing the known defect. As another test data may be similar to, but different from the information regarding the operational circumstances for causing the known defect. For example, if the information regarding the operational circumstances for causing the known defect comprises at time T1 providing a data element A to interface 1 of component A before providing at time T2 a data element B at that same interface, the test data may be such that the order of presenting the data elements A and B are transposed and at time T1 data element B is provided to interface 1 of component A of the system under test before data element A is provided at that same interface. As another possibility, a new data element (data element C) having a value similar to that of data element B may be employed instead of data element B.

A person skilled in the art will recognise other mariners in which information regarding the operational circumstances can be modified to provide test data that is based on and similar to, but not the same as, the information regarding the operational circumstances known to cause the known defect. Particular manners would include the modification of randomly, or pseudo-randomly selected features of the information regarding the operational circumstances by predetermined or random/pseudo-random amounts, and/or by swapping selected parts of the information.

Once a test case has been created, it can be run on the new system to determine whether or not it causes a defect. In the event that a defect is caused, then information regarding the profile of the new system and information regarding the operational circumstances in which the defect occurred may be captured and added to the defect store.

Figure 5:
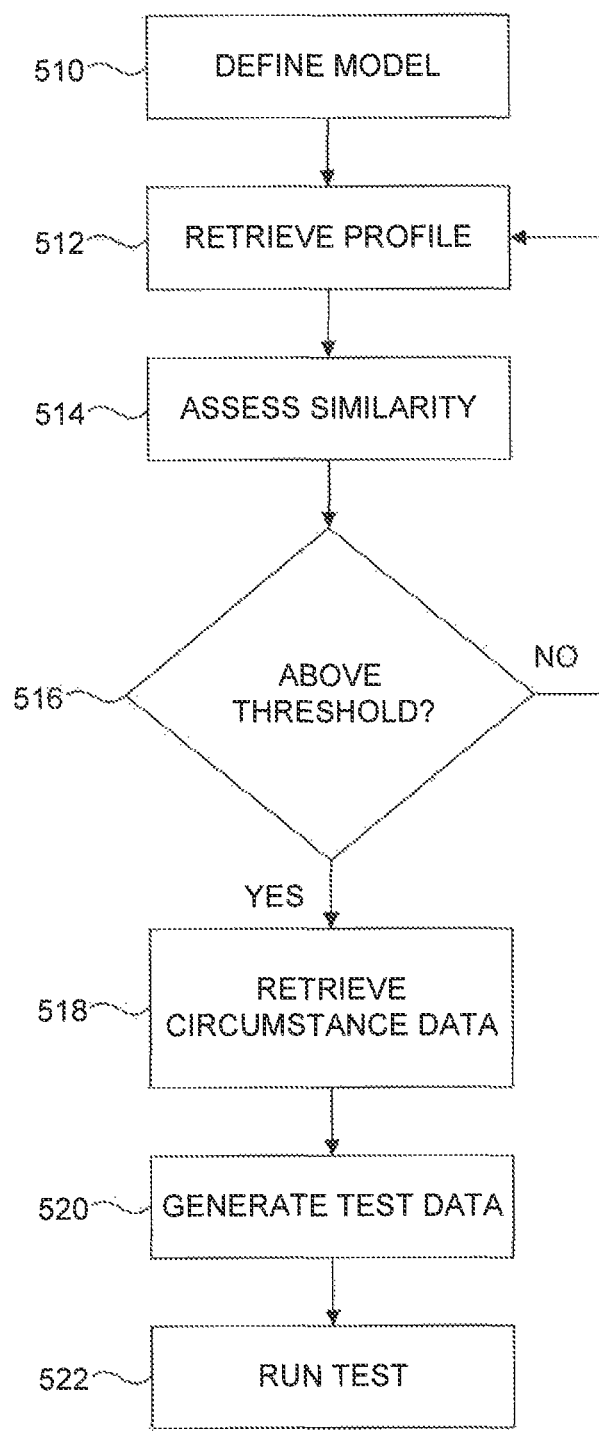
FIG. 5 shows a flow diagram of the process of creating test data.
Figure 6:
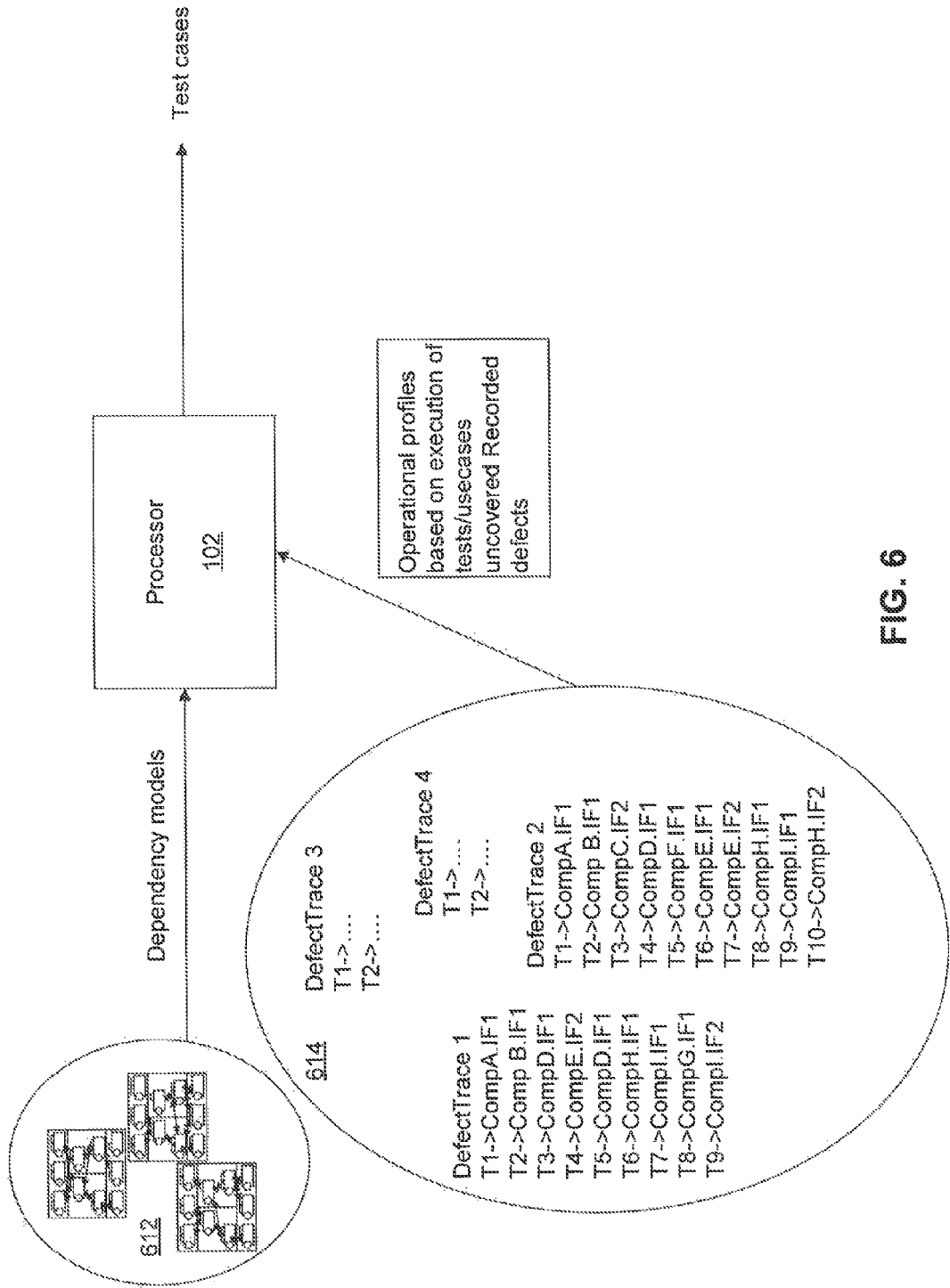
FIG. 6 shows a representation of the meta-components of a system configured to carry out the process of FIG. 5.

FIG. 5 shows a flow diagram of the process of creating test data as described herein and FIG. 6 shows a representation of the meta-components of a system configured to carry out the process of FIG. 5. At step 510, the processor 102 creates new profile data for the new system that is to be tested. The processor 102 then retrieves, at step 512 a set of profile data from profile store 612. The retrieved profile data having been previously stored at profile store 612 because it was known or expected that the retrieved profile data was associated with a defect. At step 514, the processor 102 assesses, by way of a similarity measure, the similarity of the retrieved profile data to the new profile data that it created at step 510. In the event that the similarity measure is below a predetermined similarity threshold and so the retrieved profile data is not sufficiently similar to the new profile data, then the process returns to step 512. If instead, the similarity measure is above the predetermined similarity threshold, then, at step 518, the processor 102 retrieves from the defect store 614 information relating to the operational circumstances under which a defect occurred for a system having the retrieved profile. The retrieved operational circumstances information is then used by the processor 102 at step 520 to create test data for the new system which at step 522 it runs on the new system.

As one possibility, in order to efficiently, search for defects, the threshold may initially be set to a high value so that only systems having a very similar profile to the one under test are used in the creation of test data. Subsequently, the threshold be stepped down with a cycle of the process of FIG. 5 being carried out at each step so as to gradually expand the search space whilst identifying the most likely defects first.

As complex systems can have very large numbers of potential interactions between their components, there is seldom time to test all possible interactions to determine whether or not a defect exists for each given interaction. Furthermore, in practice not all such possible interactions are plausible or probable in real deployment scenarios and so it is helpful not to concentrate on such interactions. By employing knowledge of areas in search space with which defects are likely to be associated, the efficiency with which defects may be located in new systems is substantially enhanced.

In practice, it can be difficult to first identify complex or hard defects; the approaches described herein advantageously enable testing for similar defects without needing to go through the difficulties associated with first identification.

As one possibility, test data is produced as a test program that will result in an execution sequence corresponding to operational circumstances in which a defect may occur. As another possibility, test data is produced as a direct execution sequence; in such circumstances, some interactions may need to be forced and a test harness may be required. An example test harness would have a test driver component arranged to invoke top level APIs (Application Program Interfaces) in order to simulate the interactions of a particular usecase. As component interactions can happen in parallel due to multi-processing capabilities, the test driver may have capabilities to force a specific sequence of component interactions.

In one example, the information regarding operational circumstances conforms to an agreed common format. Accordingly, irrespective of the specific method of profiling employed for a given system, the output generated from various profiled systems is still comparable/compatible and can be understood in the same manner In one example, profile data conforms to an agreed common format. In the event that different profiling tools are used to profile different systems, then output of one or more of the profiling tools may be passed through an adaptor to convert that output into the common format.

As one possibility, profile data may be stored in the profile store in a manner that logically groups similar profiles so that, once one profile in a given group has been determined to be similar to that of a system under test, the other profiles in that group may be used to derive test data without the need to perform additional similarity measure calculations.

As one possibility, once a system has been profiled, it may become apparent that one or several components of that system have more interactions with other components than normal. Knowledge of such component(s) may be taken as a hint that defects are likely to be associated therewith and a new profile data set corresponding to a portion of the system including the component(s) having more interactions may then be defined for use with the methods described herein.

A person skilled in the art will recognise that, whilst the approaches described herein may be applied to the testing of homogenous systems—for example: those written all in the same programming language and with each component being compiled by the party(ies) performing the testing, those running in the same operating system (e.g. Android systems in the mobility domain), and closed/packaged systems like SAP from ERP domain or popular technology domains like Java based developments—the systems described herein may equally be applied to heterogeneous systems which may involve multiple technologies, operating systems, programming languages, or the like. As a single profiling tool for a given heterogeneous system may not exist, a plurality of different profiling tools may need to be employed with their outputs being combined for the determination of similarity measures.

Whilst the above has been described in terms of the identification of defects before the release of a system, a skilled person would understand that the approaches described herein could equally be applied to ongoing (post-release) defect identification and quality assurance processes.

The methods described herein may be implemented on, and carried out by, one or more computers and may be carried by a computer readable signal and/or a computer readable medium comprising machine readable instructions arranged, upon execution by a processor, to carry out one or more of the methods described herein.

A person skilled in the art will appreciate that, while the different steps involved in carrying out the processes described herein have been described individually, those steps may, where appropriate, be carried out in a combined or parallel manner and/or may be fully- or semi-automated.

A person skilled in the art will understand that, although for the purposes of explanation a number of different method and apparatus features have been described in combination herein, each of those features may be employed alone or in any other combination and the presence of a feature in a particular example need not mean that that feature is necessary to realise either that or another example.

What is claimed is:

1. A method comprising:
   identifying, by a device, that profile data associated with a system is similar to stored profile data associated with another system;
   retrieving, by the device, information regarding operational circumstances for causing a defect associated with the stored profile data;
   creating, by the device and based on the retrieved information, test data for testing information associated with the system by:
     determining, using the information regarding operational circumstances, a cause of the defect; and
     determining, based on determining the cause of the defect, an arrangement of data elements to minimize a future defect by at least one of:
       modifying an order associated with at least two data elements, of the data elements; or
       replacing a data element, of the data elements, with another data element; and
   testing, by the device and using the test data, the information associated with the system.

2. The method of claim 1, where identifying that the profile data is similar to the stored profile data includes:
   calculating a measure of similarity between the profile data and the stored profile data; and
   determining that the calculated similarity measure satisfies a predetermined criteria.

3. The method of claim 1, further comprising:
   deriving, from the system, the profile data.

4. The method of claim 1, further comprising:
   retrieving the stored profile data from a storage device that includes a plurality of types of profile data.

5. The method of claim 1, where modifying the order associated with the at least two data elements includes:
   swapping the order of the at least two data elements.

6. The method of claim 1, further comprising:
   determining, based on testing the information associated with the system, that a particular defect occurs; and
   storing, based on determining that the particular defect occurs, information regarding an operational circumstance associated with the particular defect.

7. The method of claim 1, further comprising:
   storing the profile data; and
   using the stored profile data to test another system.

8. A non-transitory computer readable medium storing instructions, the instructions comprising:
   one or more instructions which, when executed by a processor of a device, cause the processor to:
     identify that profile data associated with a system is similar to stored profile data associated with another system;
     retrieve information regarding operational circumstances for causing a defect associated with the stored profile data;
     create, based on the retrieved information, test data for testing information associated with the system,
       the one or more instructions to create the test data including:

one or more instructions to determine, using the information regarding operational circumstances, a cause of the defect; and one on more instructions to determine, based on determining the cause of the defect, an arrangement of data elements to minimize a future defect by at least one of:

modifying an order associated with at least two data elements, of the data elements; or replacing a data element, of the data elements, with another data element; and test, using the test data, the information associated with the system.

9. The non-transitory computer readable medium of claim 8, where the one or more instructions to identify that the profile data is similar to the stored profile data include:

one or more instructions to calculate a measure of similarity between the profile data and the stored profile data and one or more instructions to determine that the calculated similarity measure satisfies a predetermined criteria.

10. The non-transitory computer readable medium of claim 8, where the instructions further include:

one or more instructions to derive, from the system, the profile data.

11. The non-transitory computer readable medium of claim 8, where the instructions further include:

one or more instructions to retrieve the stored profile data from a storage device that includes a plurality of types of profile data.

12. The non-transitory computer readable medium of claim 8, where the one or more instructions to modify the order associated with the at least two data elements include:

one or more instructions to swap the order of the at least two data elements.

13. The non transitory computer readable medium of claim 8, where the instructions further include:

one or more instructions to determine, based on testing the information associated with the system, that a particular defect occurs; and one or more instructions to store, based on determining that the particular defect occurs, information regarding an operational circumstance associated with the particular defect.

14. A device comprising:

a memory to store instructions; and a processor to execute the instructions to:

identify that profile data associated with a system is similar to stored profile data associated with another system;

retrieve information regarding operational circumstances for causing a defect associated with the stored profile data;

create, based on the retrieved information, test data for testing information associated with the system, the processor, when creating the test data, being to:

determine, using the information regarding operational circumstances, a cause of the defect; and determine, based on determining the cause of the defect, an arrangement of data elements to minimize a future defect by at least one of:

modifying an order associated with at least two data elements, of the data elements; or replacing a data element, of the data elements, with another data element; and test, using that test data, the information associated with the system.

15. The device of claim 14, where the processor, when identifying the profile data is similar to the stored profile data, is to:

calculate a measure of similarity between the profile data and the stored profile data; and determine that the calculated similarity measure satisfies a predetermined criteria.

16. The device of claim 14, where the processor is further to:

derive, from the system, the profile data.

17. The device of claim 14, where the processor is further to:

retrieve the stored profile data from a storage device that includes a plurality of types of profile data.

18. The device of claim 14, where the processor, when modifying the order associated with the at least two data elements, is to:

swap the order of the at least two data elements.

19. The device of claim 14, where the processor is further to:

determine, based on testing the information associated with the system, that a particular defect occurs; and store, based on determining that the particular defect occurs, information regarding an operational circumstance associated with the particular defect.

20. The device of claim 14, where the processor is further to:

store the profile data; and use the stored profile data to test another system.

* * * * *

UNITED STATES PATENT AND TRADEMARK OFFICE
CERTIFICATE OF CORRECTION

PATENT NO. : 9,244,821 B2
APPLICATION NO. : 14/039020
DATED : January 26, 2016
INVENTOR(S) : Basil Eljuse Page 1 of 1

It is certified that error appears in the above-identified patent and that said Letters Patent is hereby corrected as shown below:

Claims

Please correct Claim 8 as follows:

Column 11, line 4, change "one on more" to -- one or more --.

Please correct Claim 13 as follows:

Column 11, line 36, change "The non transitory" to -- The non-transitory --.

Please correct Claim 14 as follows:

Column 12, line 16, change "using that test" to -- using the test --.

Signed and Sealed this
Ninth Day of August, 2016

Michelle K. Lee
*Director of the United States Patent and Trademark Office*